United States Patent
Kobayashi

(10) Patent No.: US 6,181,659 B1
(45) Date of Patent: Jan. 30, 2001

(54) OPTICAL INFORMATION RECORDING METHOD FOR OPTICAL INFORMATION RECORDING APPARATUS

(75) Inventor: Seiji Kobayashi, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/134,154

(22) Filed: Aug. 14, 1998

(30) Foreign Application Priority Data

Aug. 15, 1997 (JP) .................................................... 9-220452

(51) Int. Cl.$^7$ ........................................................ G11B 7/00
(52) U.S. Cl. ............................... 369/59; 369/48; 369/54
(58) Field of Search .................................. 369/47, 48, 49, 369/50, 54, 58, 59, 32; 360/48, 51, 53

(56) References Cited

U.S. PATENT DOCUMENTS 5,459,710 * 10/1995 Hoshino et al. ................ 369/49 X
5,553,042 * 9/1996 Usui ................................. 369/50
5,559,777 * 9/1996 Maeda et al. ...................... 369/50

* cited by examiner

Primary Examiner—Muhammad Edun
(74) Attorney, Agent, or Firm—Sonnenschein, Nath & Rosenthal

(57) ABSTRACT

An optical information recording apparatus and an optical information recording method which are capable of reducing jitter generated from a disc and capable of decoding signals stably at high transmission rate are proposed. The optical information recording apparatus for forming pits on an optical recording medium by on-off controlling a laser beam based on a modulation signal generated by modulating an recording signal is provided with a radial position detection circuit for detecting the radial position where recording is now performed, a pattern detection circuit for determining the pattern of the modulation signal, and a timing correction circuit for adjusting the edge position based on both outputs from the pattern detection circuit and the radial position detection circuit.

7 Claims, 7 Drawing Sheets

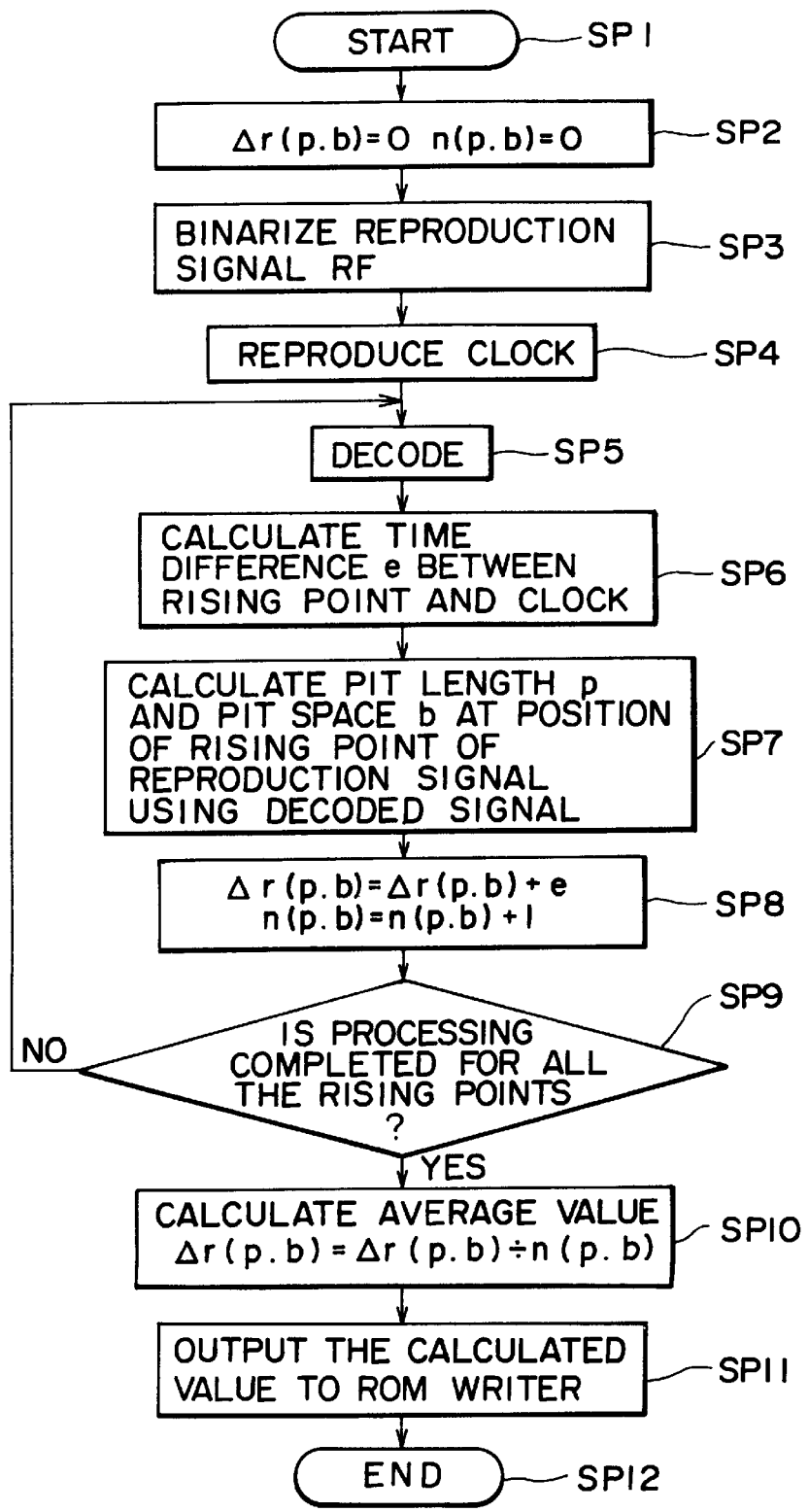

OPTICAL INFORMATION RECORDING METHOD FOR OPTICAL INFORMATION RECORDING APPARATUS

BACKGROUND OF THE INVENTION

1. Field of the Invention

This invention relates to an optical information recording apparatus and an optical information recording method, which are applied to recording apparatus for, for example, compact discs (CD) and digital video discs (DVD).

According to the present invention, excellent pits are formed over the entire surface of a disc and a high quality disc in comparison with conventional discs is provided by controlling the timing of laser beam irradiation during recording correspondingly to the radial position where recording is now performed and the recording pattern.

2. Description of Related Art

Heretofore, for example, in a recording apparatus for compact discs namely an optical information recording medium of this sort, data for recording is subjected to data processing, followed by EFM (Eight-to-Fourteen Modulation), thus a bit string having a period of 3T to 11T is generated with respect to a predetermined basic period T, and an audio data is recorded.

Correspondingly, in a compact disc player, a laser beam is irradiated onto a compact disc and the return beam is received, a reproduction signal having the signal level which changes correspondingly to the light quantity of return beam is obtained, the reproduction signal is binarized with a predetermined slice level to generate a binarized signal. A PLL circuit is driven using the binarized signal to generate a reproduction clock, the binarized signal is latched successively by the reproduction clock, and a reproduction data having a period of 3T to 11T corresponding to the pit string formed on a compact disc is generated.

The compact disc player decodes the reproduction data generated as described herein above by performing data processing corresponding to the data processing performed when recording, and the audio data recorded in a compact disc is reproduced.

As for recording and reproduction of such conventional compact disc (CD), Japanese Published Unexamined Patent Application No. Sho 58-2628 discloses a disc recording apparatus in which the pit is formed on a disc so that a reproduction signal is obtained without deviation from the recording signal by changing output power of a laser beam and by reducing the pulse width of a pulse signal. Japanese Published Unexamined Patent Application No. Hei 3-83230 discloses an optical recording apparatus in which a write pulse having a pulse width shorter by pulse width decrement corresponding to the length increment of the pit due to a thermal time constant of the optical recording medium is generated from a base band signal, the recording light which is pulse width-modulated using the write pulse is irradiated onto the optical recording medium, and the pit with a normal length is formed on the optical recording medium having a large thermal time constant correspondingly to the base band signal. Japanese Published Unexamined Patent Application No. Sho 62-54830 discloses an optical disc recording reproduction apparatus for realizing the optimal recording condition of a used disc and environmental condition regardless of difference in recording sensitivity of respective discs or regardless of fluctuation of a laser beam due to temperature change to improve the reliability of the reproduction signal, and for realizing high density information recording in which apparatus recording is performed with successive changing of the pulse width of the laser beam and the pulse width is selected when the pulse width of the reproduction signal is in a predetermined desired range.

Recently, reproduction of a compact disc at high transmission rate has been generalized. In a high transmission rate reproduction apparatus, a compact disc is rotated, for example, at a speed 8 or more times the prescribed speed to reproduce data at high rate. By using a high transmission rate reproduction apparatus, data of the same quantity is obtained within a far shorter time in comparison with the conventional transmission rate.

In order to reproduce data at a high transmission rate, high speed disc rotation and wide band electronic circuits are required. Because a wide band electronic circuit is generally involved in high noise level problem, in order to reproduce signals stably in high noise level environment, jitter of a disc should be reduced.

The present invention has been accomplished in view of this point, it is the object of the present invention to provide an optical information recording apparatus and an optical information recording method which are capable of reducing jitter generated from a disc and capable of decoding signals stably at high transmission rate.

SUMMARY OF THE INVENTION

To solve the above-mentioned problem, an optical information recording apparatus of the present invention for forming pits on an optical recording medium by on-off controlling a laser beam based on a modulation signal generated by modulating an recording signal is provided with a radial position detection means for detecting the radial position where recording is now performed, a pattern detection means for determining the pattern of the modulation signal, and a timing correction means for adjusting the edge position based on both outputs from the pattern detection means and the radial position detection means.

An optical information recording method of the present invention is a method in which the signal level of a modulation signal is switched, a laser beam is modulated based on the modulation signal to form successively pits, and desired data is recorded in the form of pit, wherein the radial position where recording is now performed and variable pattern of a recording signal are detected, the edge position of the modulation signal is moved based on the radial position and pattern of the recording signal, and thereafter recording is performed.

The optical information recording apparatus and an optical information recording method function as described herein under.

In the present invention, the modulation signal having the signal level which is switched based on data is generated, the edge position of the modulation signal is corrected correspondingly to the variable pattern of the modulation signal and the radial position where recording is now performed, and thereafter the pit is formed on an optical recording medium by on-off controlling the laser beam for recording.

Hence in the optical information recording apparatus, jitter due to deviation of pit configuration from the ideal is eliminated by adjusting finely the edge position of the recording pulse based on the recording pattern, and a disc with reduced jitter is realized. Further, jitter due to intersymbol interference of signals recorded on a disc is reduced. Because the edge position is adjusted based on the radial position, the edge position is finely corrected over the entire surface of a disc correctly. As the result, the total jitter is reduced, signals are reproduced stably regardless of somewhat high noise level due to high transmission rate.

BRIEF DESCRIPTION OF THE DRAWINGS

FIG. 7 is a flow chart for describing a process sequence of a computer in the process shown in FIG. 6.

DETAILED DESCRIPTION OF THE PREFERRED EMBODIMENTS

Embodiments of the present invention will be described in detail hereinafter with reference to the drawings.

Figure 1:
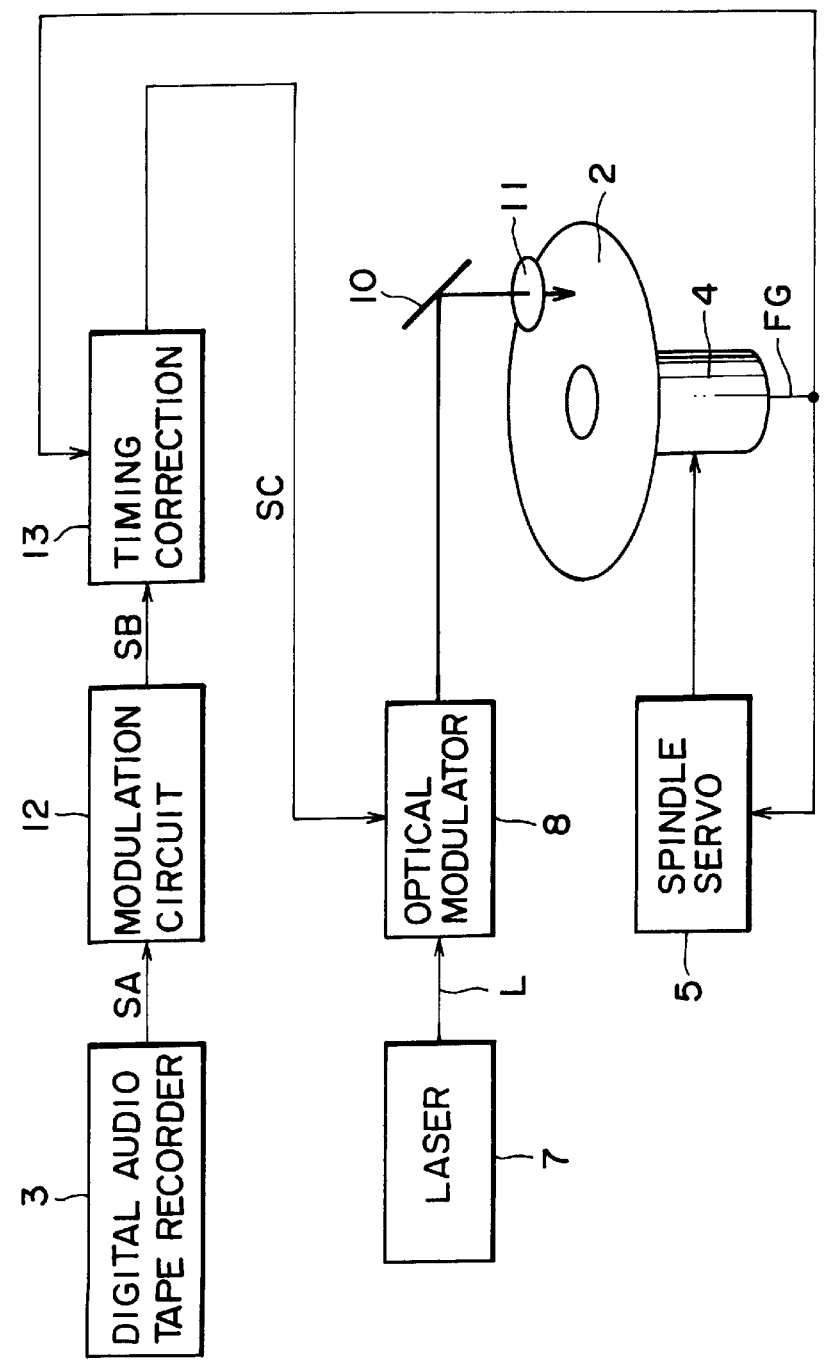
FIG. 1 is a block diagram for illustrating an optical disc apparatus in accordance with an embodiment of the present invention.

FIG. 1 is a block diagram for illustrating an optical disc apparatus in accordance with an embodiment of the present invention. The optical disc apparatus 1 records an audio data SA outputted from an digital audio tape recorder 3 on an original disc 2 by exposing the original disc 2. In manufacturing process of optical discs, the original disc 2 is developed and subjected to electrocasting process to make a mother disc, and then a stamper is made from the mother disc. Further in manufacturing process of optical discs, a disc shaped substrate is made using the stamper made as described herein above, a reflection film and a protection film are formed on the disc shaped substrate to complete a compact disc.

In this optical disc apparatus 1, a spindle motor 4 rotates the original disc 2, and an FG signal generation circuit held on the bottom outputs an FG signal FG having a signal level which rises every predetermined angular rotation. A spindle servo circuit 5 drives the spindle motor 4 correspondingly to the exposed position on the original disc 2 so that the frequency of the FG signal FG is adjusted to a predetermined frequency, and thereby the original disc 2 is rotated at a constant linear speed.

A recording laser 7 comprises a gas laser, and emits a laser beam L onto the original disc. An optical modulator 8 comprises an electroacoustic optical element, on-off controls the laser beam L correspondingly to a modulation signal SC, and outputs it. A mirror 10 reflects the laser beam L angularly onto the original disc 2, and an objective lens 11 focuses the reflected beam from the mirror onto the original disc 2. The mirror 10 and the objective lens 11 are moved successively from the inside circumference to outside circumference of the original disc 2 synchronously with rotation of the original disc 2 by a thread mechanism not shown in the drawing, and thereby the position exposed to the laser beam L is changed successively from the inside circumference to the outside circumference of the original disc 2.

As the result, in the optical disc apparatus 1, the mirror 10 and the objective lens 11 are moved with rotation of the original disc 2 to form a spiral track and pits are formed successively on the track correspondingly to the modulation signal SC.

A modulation circuit 12 receives an audio data SA outputted from the digital audio tape recorder 3, and adds a corresponding sub code data on the audio data SA. Further, the modulation circuit 12 performs data processing on the audio data SA and sub code data according to compact disc format to generate a modulation signal SB. In detail, the modulation circuit 12 adds an error correction code to the audio data SA and sub code data, and then performs interleave processing and EFM modulation processing. The modulation circuit 12 thereby outputs the EFM modulation signal SB having the signal level which changes with a period of integral multiple (period 3T to 11T) of basic period T with respect to the basic period T for pit formation.

In a conventional optical disc recording apparatus, the EFM modulation signal SB generated as described herein above is supplied to an optical modulator 8 and a beam obtained from a laser 7 is irradiated onto an original optical disc 2 by on-off controlling.

In a disc manufactured by such conventional method, the condition of a reproduction signal depends on the pattern of a recording signal to change, and the change causes jitters. In detail for example, in use of a disc in which data are recorded by a conventional optical disc recording apparatus, it has been observed that a pit with the minimum size corresponding to a 3T signal is recorded always as a pit smaller than the ideal size. Therefore, a signal from a pit corresponding to a 3T signal is binarized at a predetermined slice level, the binarized signal having a pulse width a little shorter than 3T is found, and the shorter pulse width causes jitters. The frequency of such phenomenon depends on the position on the radius though it happens on the same disc. In some cases, for example, the phenomenon of reduced 3T pit described herein above is found remarkably on the inner circumferential area but is found not so remarkably on the outer circumferential area. Further, a disc on which data is recorded by the conventional method generates jitters due to inter-symbol interference.

To cope with such problem, in this embodiment, the output signal SB of the modulation circuit 12 is supplied to a timing correction circuit 13. In the timing correction circuit 13, the variable pattern of the EFM modulation signal SB is detected, and a modulation signal SC which is subjected to edge position fine adjustment performed correspondingly to the variable pattern. To the timing correction circuit 12, an FG signal is supplied from the spindle motor 4. The timing correction circuit 13 detects the position on the radius where recording is now performed by counting the FG signal, and changes the edge position fine adjustment value correspondingly to the position on the radius. The modulation signal SC obtained as described herein above is supplied to the optical modulator 8, and the output of the laser 7 is on-off controlled for recording. Thus, the problem that the pit configuration is slightly different respectively for patterns is eliminated from the entire disc surface which is made as described herein above, and a disc which generates reproduction signals with reduced jitter is obtained. Further, in the embodiment, because the edge position is adjusted for each recorded pattern, jitter due to pattern namely jitter due to inter-symbol interference is also removed.

Figure 2:
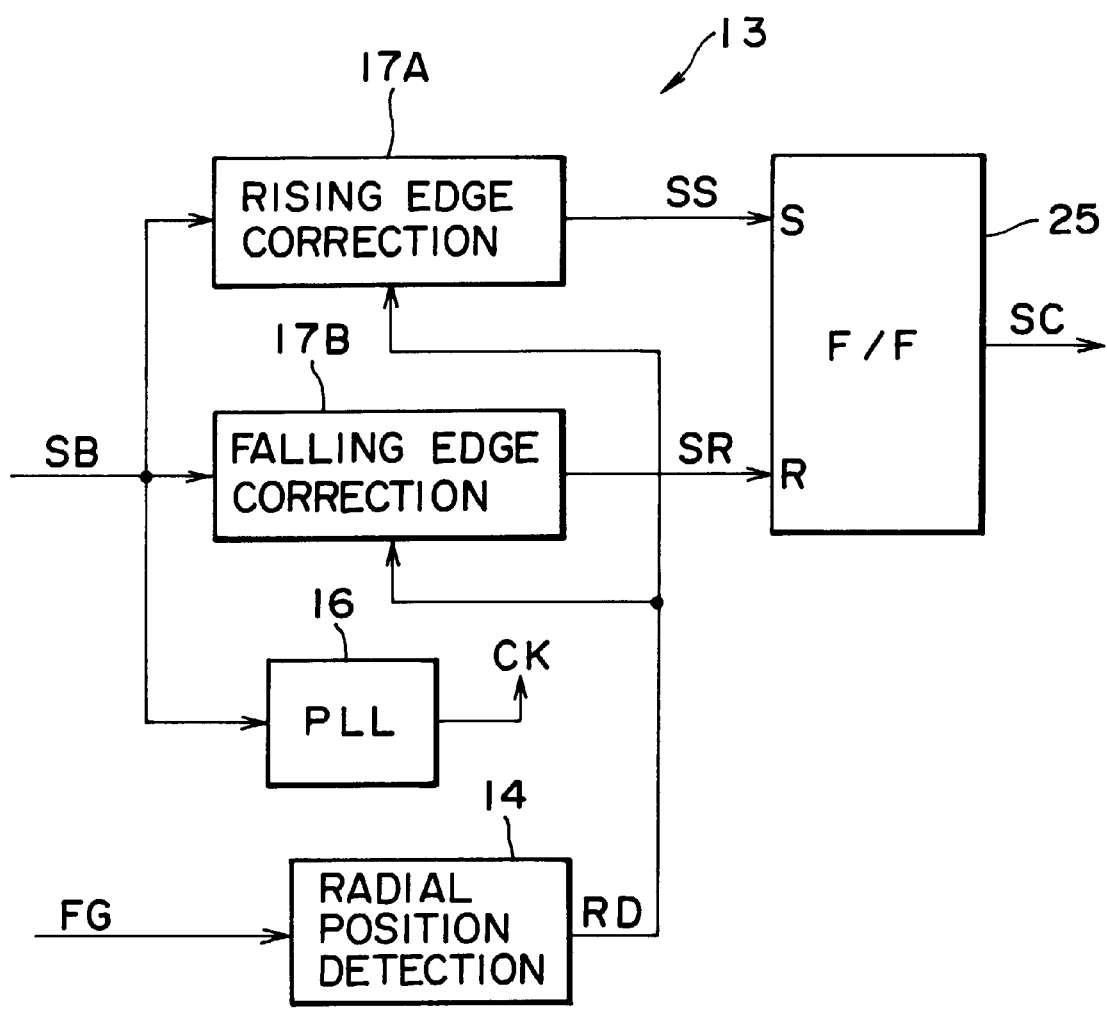
FIG. 2 is a block diagram for illustrating a timing correction circuit of the optical disc apparatus shown in FIG. 1.
Figure 5:
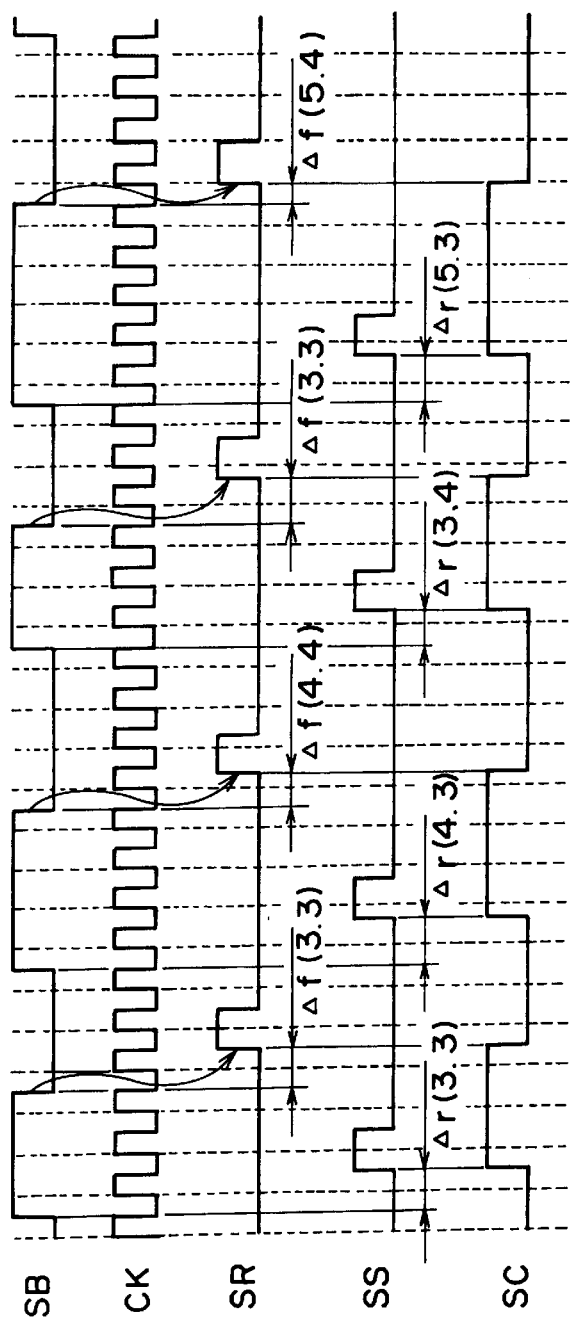
FIGS. 5A to 5E show a timing chart for describing the timing of the timing correction circuit shown in FIG. 2.

FIG. 2 is a block diagram for illustrating the timing correction circuit 13. In the timing correction circuit 13, a PLL circuit 16 generates a channel clock CK using the EFM modulation signal SB and outputs it. In this processing, the signal level of the modulation signal SB changes with a period of integral multiple of the basic period T, the PLL circuit 16 therefore generates a channel clock CK (refer to FIG. 5B) having the signal level which changes with the basic period T synchronous with the modulation signal SB, and the PLL circuit 16 supplies it to a rising edge correction circuit 17A and falling edge correction circuit 17B.

The FG signal is inputted from the spindle motor 4 to a radius detection circuit 14. The radius detection circuit 14 detects the radial position where recording is now performed, and supplies the detected information as a radial information of 3 bits to the rising edge correction circuit 17A and the falling edge correction circuit 17B.

Figure 3:
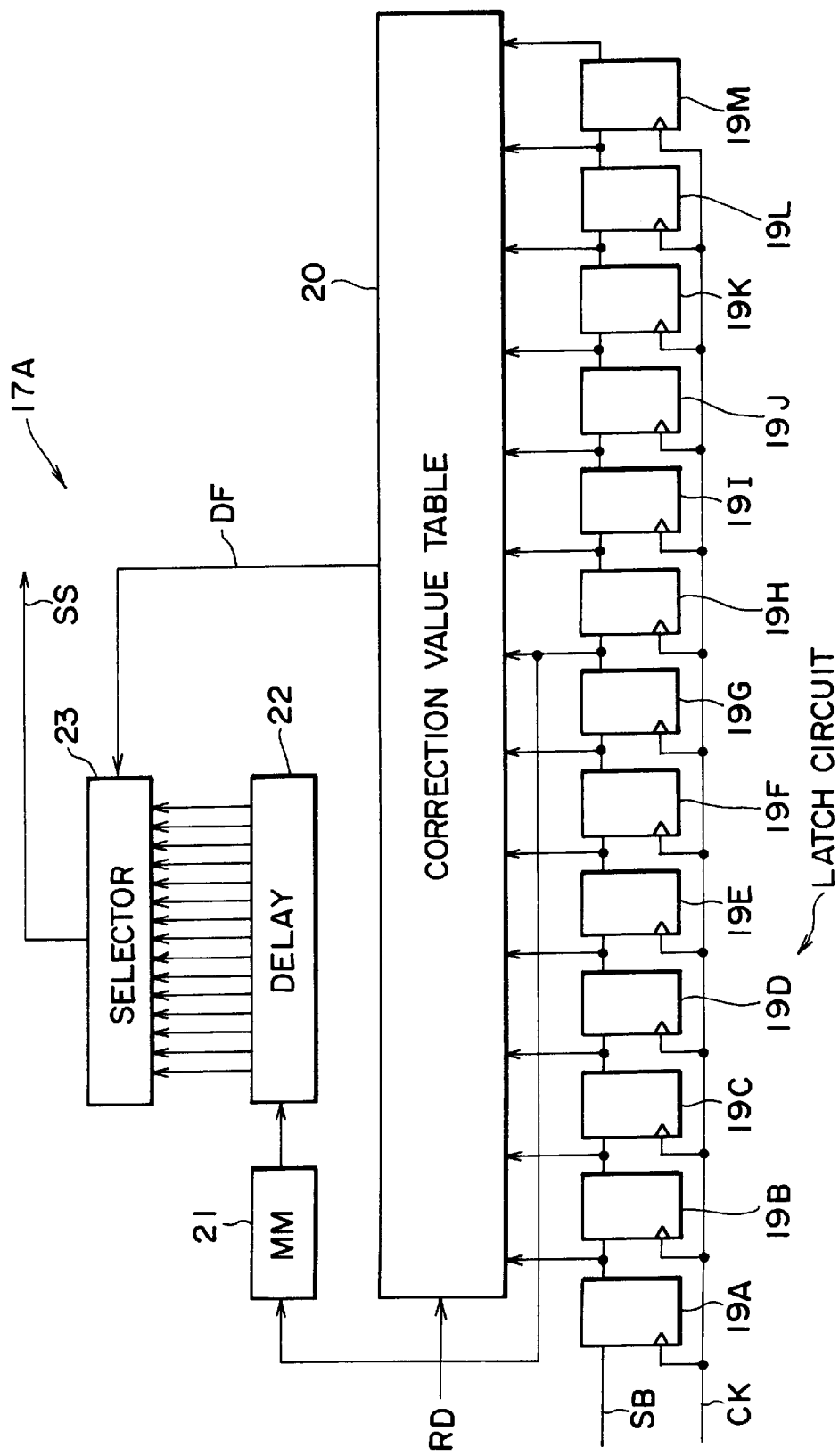
FIG. 3 is a block diagram for illustrating a rising edge correction circuit in the timing correction circuit shown in FIG. 2.

The rising edge correction circuit comprises 13 latch circuits 19A to 19M connected in series which operate in response to the clock CK as shown in FIG. 3, and the EFM modulation signal SB is inputted to the series circuit. When, the rising edge correction circuit 17A samples the EFM modulation signal SB at the timing of the channel clock CK, and detects a variable pattern of the EFM modulation signal SB based on the consecutive 13 sampling results. In detail, for example, if a latch output of "0001111000001" is obtained, then the variable pattern is determined to be a variable pattern having a space of a 5T length and following pit of a 4T length. Similarly, if a latch output of "0011111000001" is obtained, then the variable pattern is determined to be a variable pattern having a space of a 5T length and following a pit of a 5T length.

The correction value table 20 comprises a read only memory in which a plurality of correction data is stored, and in which latch outputs of the latch circuits 19A to 19M have been inputted as the low order address and the radial information RD of the radius detection circuit 14 has been inputted as the high order address. In short, the correction value table 20 outputs a correction value data DF which corresponds to both the variable pattern of the modulation signal SB and the radial position where recording is now performed. A mono-stable multi-vibrator (MM) 21 receives a latch output from the center latch circuit 19G out of 13 latch circuits connected in series, and outputs a rising pulse signal for rising of the signal level for a predetermined time period (sufficiently shorter time period than 3T period) with reference to the rising timing of the latch output.

A delay circuit 22 has a 15 step tap output, the delay time difference between taps is set as the resolution of the timing correction of the modulation signal in the edge position correction circuit 17A. The delay circuit 22 outputs rising pulse signals received from the mono-stable multi-vibrator 21 with successive delay from each tap. A selector 23 outputs selectively the tap output of the delay circuit 22 according to the correction value data DF, and outputs thereby the rising pulse signal SS having variable delay time corresponding to the correction value data DF.

Because the output RD of the radius detection circuit 14 is connected to the high order address of the correction table 20, the correction value table is switched as the radial position moves gradually toward outer. In detail, the rising edge correction circuit 17A generates a rising edge signal SS having the signal level which rises correspondingly to rising of the signal level of the EFM modulation signal SB and having the delay time $\Delta r (3, 3)$, $\Delta r (4, 3)$, $\Delta r (3, 4)$, $\Delta r (5, 3)$ . . . of each rising edge for the EFM modulation signal SB which delay time changes correspondingly to the variable pattern of the EFM modulation signal SB and the radial position where recording is now performed (refer to FIG. 5D).

In FIGS. 5A to 5E, the variable pattern of the EFM modulation signal SB is represented by the pit length p and the pit space b, the unit of which length and space is one period of the channel clock CK, and the delay time is represented by $\Delta r (p, b)$ with respect to the rising edge. Therefore, the second delay time $\Delta r (4, 3)$ shown in FIG. 5D means a delay time in the case having 3 clock blank before a pit of 4 clock length. Consequently, the correction value table 20 contains the correction value data DF corresponding to all the combinations of these p and b values.

Figure 4:
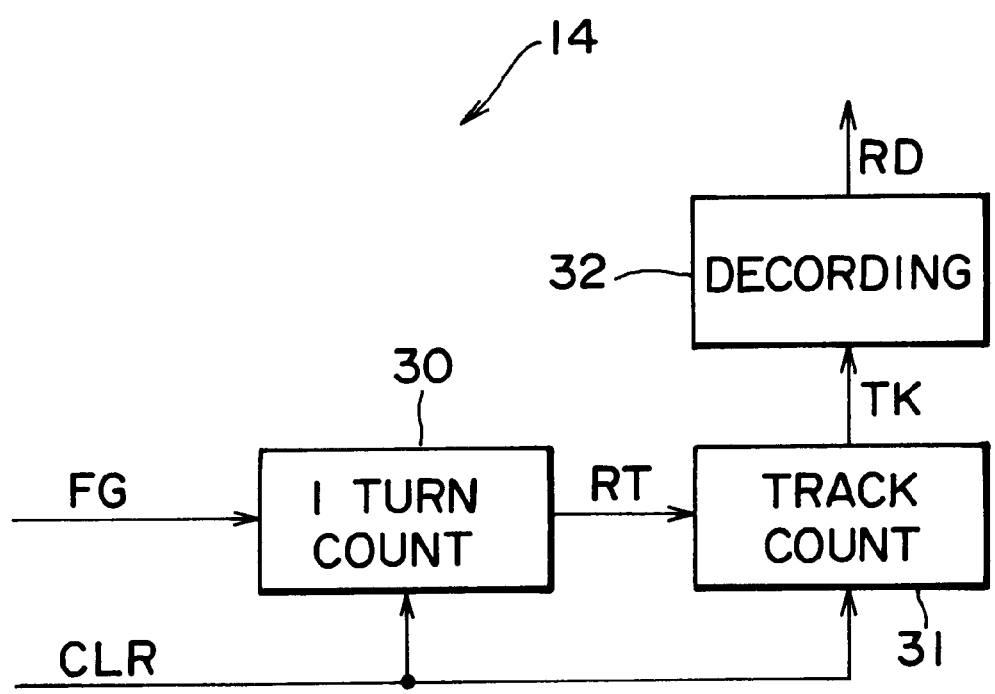
FIG. 4 is a block diagram for illustrating a radial position detection circuit in the timing correction circuit shown in FIG. 2.

FIG. 4 is a block diagram for illustrating the structure of the radius detection circuit 14 In the drawing, a one turn counter 30 and track counter 31 are cleared when recording is started in response to a clear pulse CLR supplied from a system controller not shown in the drawing and the initial value is zero. The spindle motor 4 outputs, for example, 4200 pulses for one turn of the spindle motor 4 as the FG signal. The pulse is counted 4200 times by the one turn counter 30, and a signal RT which is generated once per one turn of the spindle motor 4 is inputted to the track counter 31. The track counter 31 counts the signal RT which is generated once per one turn of the spindle motor 4 and thereby outputs the track number TK where recording is now performed. For example, in the case that a compact disc (CD) is recorded, recording begins from the radial position of 23 mm and continues to the radial position of 58 mm with a track pitch of 1.6 microns, therefore, the value of the track counter 31 changes from 0 to about 22000 counts.

The count value TK of the track counter 31 is supplied to the rising edge correction circuit 17A and falling edge correction circuit 17B through a decoding circuit 32 in the form of a 3 bit radial information RD. The decoding circuit 32 comprises a PLD (programmable logic device). The track information (15 bits) including the number, for example as described herein under, from 0 to 22000 is divided into 8 radial areas and numerals from 0 to 7 are assigned to the respective areas. A numeral from 0 to 7 is outputted as a 3 bit radial information (RD).

Example of Decoding Circuit 32
input track number (TK)→output radial information (RD)

| from 0 to 2499 | 0 |
|---|---|
| from 2500 to 4999 | 1 |
| from 5000 to 9999 | 2 |
| from 10000 to 12499 | 3 |
| from 12500 to 15000 | 4 |
| from 15000 to 17499 | 5 |
| from 17500 to 19999 | 6 |
| from 20000 | 7 |

As described herein above, the rising edge correction circuit 17A detects the pit pattern formed on the optical disc and the radial information where recording is now performed in the range of 12 T period the unit of which is the basic period T, and generates the rising edge signal SS correspondingly to the recording pattern and the radial position where recording is now performed.

The falling edge correction circuit 17B has the same structure as that of the rising edge correction circuit 17A excepting that the mono-stable multi-vibrator 21 is operated with reference to the falling edge of a latch output and the content of the correction value table 20 is different.

Accordingly, the falling edge correction circuit 17B generates a falling edge signal SR (refer to FIG. 5C) the signal level of which rises correspondingly to the falling of the signal level of the EFM modulation signal SB and which has the delay time Δf (3, 3), Δf (4, 4) Δf (3, 3), Δf (5, 4) . . . of each rising edge for the EFM modulation signal SB which delay time changes corresponding to the variable pattern of the EFM modulation signal SB and the radial position where recording is now performed. In FIGS. 5A to 5E, the delay time from the falling edge is represented by Δf (p, b) using pit length p and pit space b in the same manner as used for the delay time from the rising edge.

The falling edge correction circuit 17B also detects the pit pattern formed in the optical disc and the radial position where recording is now performed in a range of 12T period the unit of which is the basic period T, and corrects the timing of the falling edge of the modulation signal SB namely the timing of the end of laser beam irradiation correspondingly to the pattern, and a falling edge signal SR is generated.

A flip-flop (F/F) 25 (refer to FIG. 2) combines the rising edge signal SS and falling edge signal SR and outputs a combined signal. In detail, the flip-flop 25 receives the rising edge signal SS and falling edge signal SR at a set terminal S and reset terminal R respectively, and generates a modulation signal SC which rises at the timing of rising of the signal level of the rising edge signal SS and then falls at the timing of rising of the signal level of the falling edge signal SR (refer to the timing described as SS shown in FIG. 5D, SR shown in FIG. 5C, and SC shown in FIG. 5E).

As the result, the EFM modulation signal SB is converted to the signal SC, the timing of the rising edge and falling edge is corrected correspondingly to the length of the pit and land in front and in rear, and the signal SC is outputted from the timing correction circuit 13 and inputted to the optical modulator 8. The correction value can be dependent on the radial position.

The laser beam L is on-off controlled by the optical modulator 8 based on the output signal SC of the timing correction circuit 13 obtained as described herein above, and irradiated onto the original disc 2.

Accordingly, in the optical disc apparatus 1, it is possible to correct the position of the front edge and rear edge with a fine step so that jitter due to pit forming characteristic is reduced. Further, it is possible to correct pit forming characteristic due to radial position. Thus, excellent performance is obtained over the entire disc surface.

Figure 6:
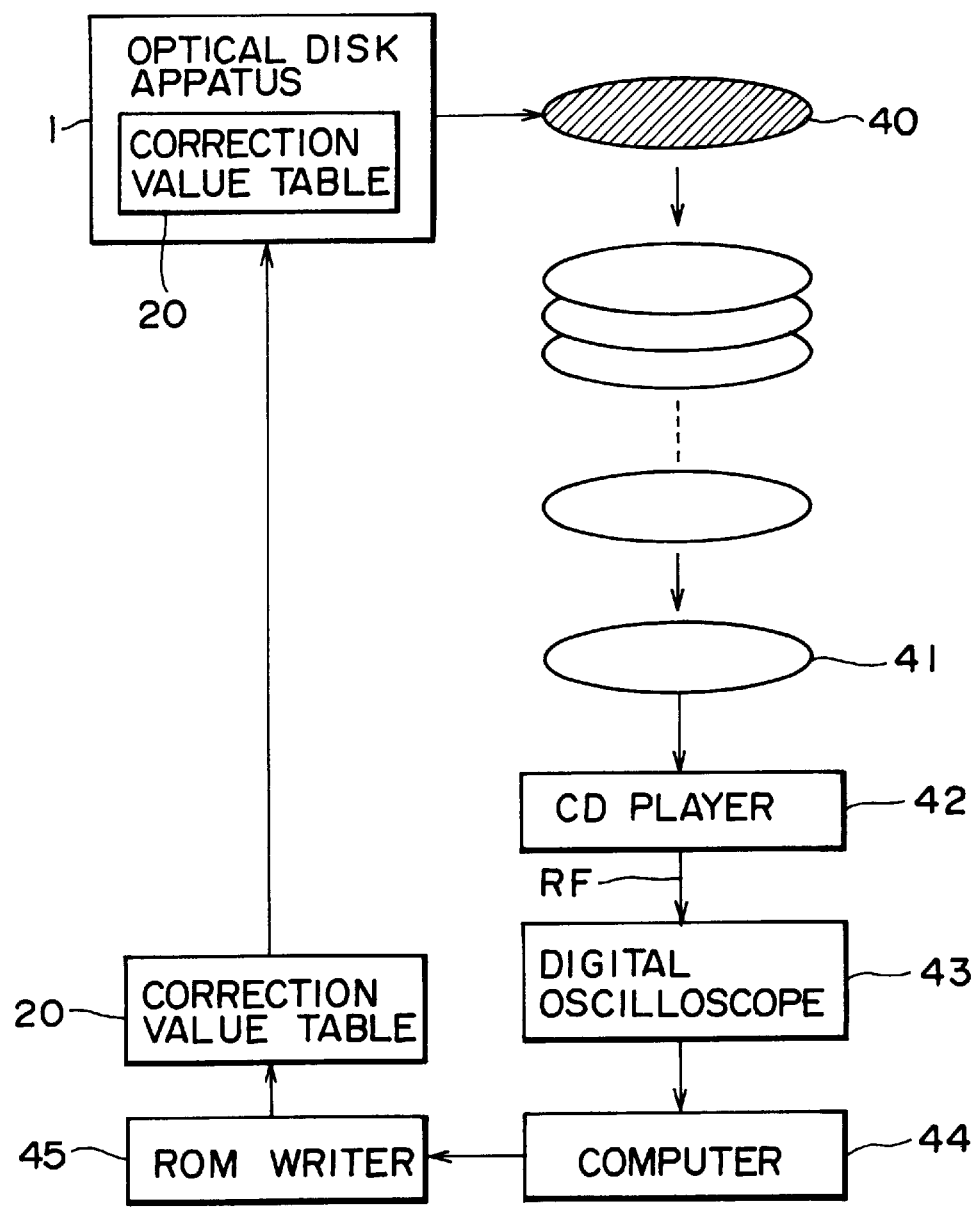
FIG. 6 is a process drawing for describing a forming process of a correction value table in the optical disc apparatus shown in FIG. 1.

FIG. 6 is a process drawing for describing formation of the correction value table 20 used for timing correction of edges as described herein above. In the optical disc apparatus 1, a reproduction signal crosses a predetermined slice level at the correct timing synchronous with the clock CK by setting properly the correction value table 20 even though recording pattern changes or recording radius is different.

The correction value table 20 is provided both in the rising edge correction circuit 17A and falling edge correction circuit 17B, but only the rising edge correction circuit 17A is described herein because the same forming method is used for both cases excepting that only the forming condition is different.

In this process, an evaluation original disc is made by the optical disc apparatus 1, and a correction table is set based on the reproduction result of a compact disc made from the original disc.

When the evaluation original disc is made, the evaluation reference correction value table 20 is set in the optical disc apparatus 1. The evaluation reference correction value table 20 is formed by setting the correction value data DF so that the center tap output of the delay circuit 22 is always outputted selectively in the selector 23 (refer to FIG. 3).

As described herein above, the signal SC is supplied to the optical modulator 8 without any effect of the timing correction circuit 13, and the original disc 2 is exposed to the laser beam L in the same manner as used when a compact disc is made usually.

The original disc 2 exposed as described herein above is developed and followed by electrocasting to form a mother disc, and a stamper 40 is made using the mother disc. Then, a compact disc 41 is made using this stamper 40 in the same manner as used in the usual process for manufacturing compact discs.

The computer 44 controls a CD player 42 and gives an indication so that the CD player 42 takes an access to any track out of tracks having the number from 0 to 2499.

The CD player 42 reproduces the evaluation compact disc 41 made previously as described hereinbefore according to the indication of the computer 44. When, the CD player 42 switches operation according to the control of the computer 44, and the reproduction signal RF having the signal level which changes correspondingly to the quantity of light of return beam obtained from the compact disc 41 is outputted from the built-in signal processing circuit and inputted to a digital oscilloscope 43.

Because pits are formed not ideally similarly to a usual compact disc in this stage, jitters are found in the reproduction signal. The jitter value can be dependent on the radial position.

The digital oscilloscope 43 performs analog digital conversion processing on the reproduction signal RF using the sampling frequency 20 times that of the channel clock, and supplies the resultant digital signal to the computer 44.

The computer 44 controls operation of the CD player 42 and digital oscilloscope 43, and also performs signal processing on the digital signal outputted from the digital oscilloscope 43, and figures out thereby the correction value data DF used in the area of track numbers 0 to 2499.

Next, the computer 44 gives an indication to the CD player 42 so as to take an access to any track out of tracks having numbers from 2500 to 4999. In the same manner as described herein above, the computer 44 performs signal processing on a digital signal outputted from the digital oscilloscope 43 again, and figures out the correction value data DF used in the area of tracks numbers 2500 to 4999.

The computer 44 repeats the same processing to figure out the correction value data DF for all the 8 track areas (0 to 7).

Finally, the computer 44 drives a ROM writer 45 to store successively the calculated correction value data DF in a read only memory, and thus the correction value table 20 is formed. Optical discs are manufactured finally using the correction value table 20 completed as described herein above.

FIG. 7 is a flow chart for describing process sequence for constructing the correction value data DF of a certain radial area. In the processing sequence, the sequence proceeds from the step SP1 to the step SP2, the computer 44 sets the jitter detection result Δr (p, b) and jitter number of counts n (p, b) to the value 0. The computer 44 figures out the jitter detection result Δr (p, b) for every combination of the pit length p and pit space b in front and in rear the edge which is addressed for jitter detection, and counts the jitter number of counts n (p, b). The computer 44 sets all the jitter detection result Δr (p, b) and jitter number of counts n (p, b) to the initial value in the step SP2 for preparation.

Subsequently, the sequence proceeds to the step SP3, the computer 44 compares the digital signal outputted from the digital oscilloscope 43 with the predetermined slice level to generate a digital binarized signal by binarizing the reproduction signal RF. In this step, the computer 44 binarizes the digital signal so that the value equal to or higher than the slice level is set to the value of 1 and the value lower than the slice level is set to the value of 0.

Subsequently, the sequence proceeds to the step SP4, the computer 44 generates the reproduction clock using the binarized signal, which is a digital signal. The computer 44 simulates operation of the PLL circuit by performing arithmetic operation processing with reference to the binarized signal to generate the reproduction clock.

Further in the subsequent step SP5, the computer 44 samples the binarized signal at the timing of each falling edge of the reproduction clock generated as described herein above, and decodes the modulation signal using the sampled binarized signal (the decoded modulation signal is referred to as decoded signal hereinafter).

Subsequently the sequence proceeds to the step SP6, the computer 44 detects the time difference e from the time point of the rising edge of the binarized signal to the time point of the falling edge of the reproduction clock located in closest proximity to this edge, and thereby counts the time of jitter. Subsequently in the step SP7, the computer 44 detects the pit length p and pit space b in front and in rear the decoded signal about the edge which was subjected to time count in the step SP6.

Subsequently in the step SP8, the computer 44 adds the time difference e detected in the step SP6 to the jitter detection result $\Delta r$ (p, b) corresponding to the pit length p and pit space b in front and in rear, and increases the corresponding jitter number counts n (p, b) by the value of 1. Subsequently the sequence proceeds to the step SP9, the computer 44 determines whether time counting is completed for all the rising edges, and if the result is NO, then the sequence returns to the step SP5.

Then the computer 44 repeats the processing sequence of steps SP5–SP6–SP7–SP8–SP9–SP5 to accumulate the time count jitter detection result for every variable pattern of the reproduction signal RF and to count the added number. The variable t pattern is classified based on the time period of 6 samples in front and in rear (total time period of 12 T period) the edge that is addressed for jitter detection with reference to the basic period T.

When time counting of jitter is completed for all the edges, the computer 44 obtains YES result in the step SP9, then the sequence proceeds to the step SP10, the time count jitter detection result for every variable pattern of there production signal RF is averaged in this step. In other words, because jitter detected in the step SP6 is affected by the noise, the computer 44 averages the jitter detection result as described herein above to improve the measurement accuracy of jitter.

After the computer 44 averages the jitter detection result as described herein above, the sequence proceeds to the step SP11 the computer 44 generates respective correction value data DF for every variable pattern based on the detection result. The correction value data DF is calculated by performing arithmetic operation processing of the equation described herein under assuming that the delay time difference between taps in the delay circuit 22 is $\tau$.

$$Hr1(p, b) = Hr0(p, b) - a/\tau \cdot \Delta r(p, b) \quad (1)$$

Wherein Hr1 (p, b) is a tap of the delay circuit 22 selected based on the correction value data DF, and the case of value 0 represents the center tap. Hr0 (p, b) is a tap of the delay circuit 22 selected based on the correction value data DF of the initial value, and in this embodiment Hr0 (p, b) is set to the value 0. a represents a constant. In this embodiment, a is set to a value of 1 or smaller (for example 0.7), the correction value data is converged consistently in spite of affection of noise.

The computer 44 stores the correction value data DF generated as described herein above in a predetermined address area of the ROM writer 45, and then the sequence proceeds to the step SP12 and the processing sequence is brought to an end. Subsequently the computer 44 performs the same processing sequence on a different radial area. After the processing is completed on all the radial areas 0 to 7, reading is performed by the ROM writer to complete the correction value table 20 in the rising edge correction circuit 17A.

The same processing is performed on the falling edge of the digital binarized signal to complete the correction value table 20 in the falling edge correction circuit 17B.

Optical discs are manufactured by the optical disc apparatus 1 using the correction value table 20 completed as described herein above. An optical disc completed as described herein above is provided with the pit of the ideal length on the entire surface of the disc, and reproduced with minimized jitter.

In the embodiment described herein above, the case that optical discs are manufactured using directly the correction value table made using the evaluation optical disc is described, however the present invention is by no means limited to the case, and alternatively, a new evaluation optical disc is made using the correction value table made using the evaluation optical disc, and the correction value table is corrected using the evaluation optical disc made newly. By correcting the correction value table repeatedly, jitter can be reduced further.

In the embodiment described herein above, the case that the quantity of jitter is measured by time counting of the binarized signal with reference to the basic clock and the correction data is generated based the resultant count is described, however the present invention is by no means limited to the case, and alternatively, the correction value data is generated by detecting the signal level of the reproduction signal with reference to the basic clock instead of counting of the quantity of jitter by time counting if practically sufficient accuracy is secured. In this case, an error voltage from the signal level of the detected reproduction signal to the slice level is calculated, and the correction value data is calculated based on the error voltage and transition response characteristic of the reproduction signal.

In the embodiment described herein above, the case that the timing of the modulation signal is corrected according to the correction value data of table form, however the present invention is by no means limited to the case, and alternatively, the correction value data is calculated by performing arithmetic operation processing and the timing of the modulation signal is corrected using the calculated correction value data instead of the previously detected correction value data if practically sufficient accuracy is secured.

Because the optical information recording apparatus of the present invention for forming pits on an optical recording medium by on-off controlling a laser beam based on a modulation signal generated by modulating a recording signal is provided with a radial position detection means for detecting the radial position where recording is now performed, a pattern detection means for determining the pattern of the modulation signal, and a timing correction means for adjusting the edge position according to both outputs from the pattern detection means and the radial position detection means, the optical information recording apparatus functions so that the edge position of the recording pulse is adjusted finely based on the recording pattern and recording radial position, and the value of jitter due to deviation of the pit size from the ideal size is reduced over the entire surface of a disc. Because the edge position of the recording signal is adjusted finely based on the pattern of the recording signal in the optical information recording apparatus, inter-symbol interference from pits recorded in front and in rear the pit which is now reproduced is reduced, therefore, the optical information recording medium made by the optical information recording apparatus functions so that more excellent jitter characteristic is obtained. Accordingly, the optical information recording medium made by the optical information recording apparatus functions so that reproduction is performed stably even though noise level is somewhat high because of high transmission rate.

Because the optical information recording apparatus of the present invention detects the radial position by counting the pulse outputted synchronously with rotation of the motor which rotates the optical recording medium in the above-mentioned structure, the optical information recording apparatus functions so that the radial position is measured with high accuracy without any additional device exclusively used for detecting the radial position and the edge position of the recording pulse is adjusted finely based on the recording pattern and recording radial position.

Because the optical information recording apparatus of the present invention has the timing correction means which corrects the timing of the modulation signal so as to change the binarized signal with reference to the basic period of the modulation signal when the reproduction signal obtained from the optical recording medium is binarized with the prescribed slice level to generate the binarized signal in the above-mentioned structure, the optical information recording apparatus functions so that the reproduction signal is binarized with adjustment under the optimal slice level condition by controlling intentionally the slice level of the reproduction signal.

Because the radial position where recording is now performed and variable pattern of the recording signal are detected and the edge position of the modulation signal is moved and thereafter recorded in the optical information recording method in which the signal level of the modulation signal is switched, the laser beam is modulated based on the modulation signal to generate successively pits, and desired data is recorded in the form of the pit, the optical information recording method functions so that the edge position of the recording pulse is adjusted finely based on the recording pattern and recording radial position, and the value of jitter due to deviation of the pit size from the ideal size is reduced over the entire surface of a disc. Because the edge position of the recording signal is adjusted finely based on the pattern of the recording signal in the optical information recording method, inter-symbol interference from pits recorded in front and in rear the pit which is now reproduced is reduced, therefore, the optical information recording medium made by the optical information recording method functions so that more excellent jitter characteristic is obtained. Accordingly, the optical information recording medium made by the optical information recording method functions so that reproduction is performed stably even though noise level is somewhat high because of high transmission rate.

What is claimed is:

1. An optical information recording apparatus for forming pits on an optical recording medium by on-off controlling a laser beam based on a modulation signal generated by modulating a recording signal, said optical information recording apparatus comprising:

radial position detection means for detecting a radial position on the optical recording medium where recording is now performed;

pattern detection means for determining a duration of adjacent pit lengths and pit spaces from said modulation signal;

timing correction means for adjusting a rising and falling edge position based on both outputs from said pattern detection means and said radial position detection means; and an optical modulator for controlling the laser beam based on an output signal from said timing correction means.

2. The optical information recording apparatus as claimed in claim 1, wherein said radial position detection means detects the radial position by counting pulses outputted synchronously with the rotation of a motor which rotates said optical information recording medium in said optical information recording apparatus.

3. The optical information recording apparatus as claimed in claim 1, wherein the timing of said modulation signal is corrected so that a binarized signal is changed with reference to the basic period of said modulation signal when a reproduction signal obtained from said optical recording medium is binarized with a predetermined slice level to generate said binarized signal.

4. The optical information recording apparatus as claimed in claim 3, wherein said timing correction means has corrected data storing means, corrects the timing of said modulation signal based on a corrected data stored in said corrected data storing means, and said corrected data is set based on the reproduction result of an evaluation optical recording medium.

5. The optical information recording apparatus as claimed in claim 1, wherein said timing correction means corrects the timing of said modulation signal so that a binarized signal is changed with reference to the basic period of said modulation signal when a reproduction signal obtained from said optical recording medium is binarized with a predetermined slice level to generate said binarized signal.

6. The optical information recording apparatus as claimed in claim 5, wherein said timing correction means has a corrected data storing means, corrects the timing of said modulation signal based on a corrected data stored in said corrected data storing means, and said corrected data is set based on the reproduction result of an evaluation optical recording medium.

7. An optical information recording method in which a signal level of a modulation signal is switched, a laser beam is modulated based on said modulation signal to form successively pits, and desired data is recorded in the form of pits, wherein a radial position where recording is now performed and a pattern of a next writing pit and an adjacent space are detected, an edge position of said modulation signal is moved based on said radial position and said pattern of said next writing pit and said adjacent space, and thereafter said laser beam is modulated based on said edge position.

* * * * *